(12) United States Patent
Haddad et al.

(10) Patent No.: US 8,547,835 B2
(45) Date of Patent: Oct. 1, 2013

(54) CONTROLLING IP FLOWS TO BYPASS A PACKET DATA NETWORK GATEWAY USING MULTI-PATH TRANSMISSION CONTROL PROTOCOL CONNECTIONS

(75) Inventors: Wassim Haddad, San Jose, CA (US); Samy Touati, Pleasanton, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 276 days.

(21) Appl. No.: 12/909,041

(22) Filed: Oct. 21, 2010

(65) Prior Publication Data

US 2012/0099601 A1    Apr. 26, 2012

(51) Int. Cl.
H04J 1/16 (2006.01)
H04J 3/16 (2006.01)
H04L 12/28 (2006.01)
H04W 4/00 (2009.01)
H04W 40/00 (2009.01)

(52) U.S. Cl.
USPC ...... 370/230; 370/255; 370/392; 370/395.32; 370/469; 455/435.2; 455/445

(58) Field of Classification Search
USPC ............ 370/230, 328, 401, 255, 392, 395.32, 370/469; 455/445, 435.2
See application file for complete search history.

(56) References Cited

U.S. PATENT DOCUMENTS

| 2005/0185664 A1* | 8/2005 | Chaskar et al. | 370/445 |
| 2011/0075675 A1* | 3/2011 | Koodli et al. | 370/401 |
| 2012/0243441 A1* | 9/2012 | Reunamaki et al. | 370/255 |

OTHER PUBLICATIONS

Leva et al., Business Aspects of Multipath TCP Adoption, in G. Tselentis et al. (Eds.): Towards the Future Internet: Emerging Trends from European Research, ISBN 978-1-60750-538-9 (print) and ISBN 978-60750-539-6 (online), IOS Press, Apr. 2010. pp. 21-30.*
Hasegawa et al., Improved Data Distribution for Multipath TCP Communication, IEEE Globecom 2005, all pages.*
Ford et al., TCP Extensions for Multipath Operation with Multiple Addresses, Jul. 12, 2010, all pages.*
"3rd Generation Partnership Project; Technical Specification Group Services and System Aspects; Local IP Access and Selected IP Traffic Offload (Release 10)", 3GPP Standard; 3GPP 23.829, 3rd Generation Partnership Project (3GPP), Mobile Competence Centre; 650, Route Des Lucioles; F-06921 Sophia-Antipolis Cedex; France, No. V1.2.0, Sep. 14, 2010.
Ford A. et al., "Architectural Guidelines for Multipath TCP Development", draft-ford-mptcp-architecture-01, Internet Engineering Task Force, Feb. 3, 2010, entire document.

(Continued)

Primary Examiner — Xavier S. Wong
Assistant Examiner — Jeremy Costin

(57) ABSTRACT

A network element can include a proxy element that is configured to receive a request from a source node to establish a Transmission Control Protocol (TCP) connection from a first network address of the source node through a Packet Data Network Gateway (PDN GW) to a destination node for an IP flow. The proxy element applies an IP flow offloading policy function to determine that the requested TCP connection for the IP flow should bypass the PDN GW. The proxy element responds to the determination by communicating to the destination node a request for TCP connection with a second network address substituted for the first network address of the source node to establish the TCP connection for the IP flow from the source node to the destination node through a broadband network without passing through the PDN GW.

10 Claims, 10 Drawing Sheets

(56) References Cited

OTHER PUBLICATIONS

Ford A. et al., "TCP Extensions for Multipath Operation with Multiple Addresses", draft-ietf-mptcp-multiaddressed-01, Internet Engineering Task Force, Jul. 12, 2010, entire document.

3GPP TS 23.402, "Architecture Enhancements for non-3GPP accesses", Release 9, v9.0.0, Mar. 2009, entire document.

Perkins C. et al. "IP Mobility Support for IPv4", RFC 3344, Aug. 2002, entire document.

Kulkarni M. et al. "Mobile IPv4 Dynamic Home Agent (HA) Assignment", RFC 4433, Mar. 2006, entire document.

Johnson D. et al. Mobility Support in IPv6:, RFC 3775, Jun. 2004, entire document.

Haley B. et al. "Header Home Agent Switch Message", RFC 5142, Jan. 2008, entire document.

\* cited by examiner

| IP Address Translation Database 424 ||
|---|---|
| Source Node#1 IP1 Address from PDN GW | Source Node#1 IP2 Addr. from BNG |
| Source Node#2 IP3 Address from PDN GW | Source Node#2 IP4 Addr. from BNG |
| ⋮ | ⋮ |

CONTROLLING IP FLOWS TO BYPASS A PACKET DATA NETWORK GATEWAY USING MULTI-PATH TRANSMISSION CONTROL PROTOCOL CONNECTIONS

TECHNICAL FIELD

Embodiments described herein relate generally to communication systems and, more particularly, to network systems that support Fixed Mobile Convergence.

BACKGROUND

Technologies for Fixed Mobile Convergence (FMC) have been emerging in recent years with the aim of enabling a mobile terminal or other communication node to switch from direct wireless connectivity to a service provider network to indirect connectivity through a fixed access device that is within the range of the mobile terminal. The fixed access device may be located in a residence, business, or other location and may include a residential/business gateway that has a broadband connection to the Internet and provides a radio link to the mobile terminal (e.g., Wi-Fi wireless access point).

FIG. 1 illustrates a conventional network system 100 that can support FMC services. The system 100 includes a broadband network Gateway (BNG) 100, a Radio Access Network (RAN) 105, a packet data network Gateway (PDN GW) 110, a broadband packet data network 120 (e.g., Internet), and can include other network elements. In the example system 100, end nodes, such as the source node 130, can establish a radio link to the RAN 105 using one or more wireless communication protocols, such as the Third Generation Partnership Project (3GPP), to communicate data packets through the PDN GW 110 and packet data network 120 to other nodes, such as the destination node 140. Alternatively or additionally, the source node 130 can also establish a radio link to the BNG 100 using, for example, WI-FI (e.g., IEEE 802.11) or WiMAX, to communicate data packets through the BNG 100 and packet data network 120.

The PDN GW 110 provides packet data connectivity between the node 130 and the packet data network 120 and serves as an anchor for node mobility between 3GPP and non-3GPP radio connections, and can perform policy enforcement, packet filtering, and/or charging support for all traffic flowing from/to the node 130. The PDN GW 110 assigns a home Internet Protocol (IP) address (e.g., IPv6 address) to the node 130, which is included in the header of data packets sent from/to the node 130. Irrespective of whether the node 130 establishes a connection through either the RAN 105 or the BNG 100, all data packet traffic flowing from/to the node 130 is routed through the PDN GW 110 responsive to the home IP address.

SUMMARY

Various embodiments of the present invention are directed to controlling the path of packet traffic to selectively allow the traffic to flow through a PDN GW or to instead bypass the PDN GW. Bypassing the PDN GW avoids unnecessarily burdening the PDN GW with providing services for that traffic.

In some embodiments, a system includes a BNG element and a proxy element. The BNG element is configured to respond to receipt of a first request for TCP connection having a first network address of the source node by establishing a Transmission Control Protocol (TCP) connection between the source node and a destination node through a PDN GW and broadband network. In contrast, the BNG element responds to receipt of a second request for TCP connection having a second network address of the source node by establishing another TCP connection between the source node and the destination node through the broadband network without passing through the PDN GW.

The proxy element can intercept the first request for TCP connection being communicated from the source node to the BNG element and determine that it contains information that satisfies at least one rule defined by an IP flow offloading policy function. The proxy element responds to the determination by generating the second request for TCP connection from the first request for TCP connection by substituting the second network address for the first network address of the source node. The proxy element communicates the generated second request to the BNG element to establish a TCP connection between the source node and the destination node through the broadband network without passing through the PDN GW.

The proxy element can then intercept packets passing from the source node toward the destination node that contain the first network address as the source address and replace the first network address with the second network address as the source address to bypass the PDN GW. The proxy element can also intercept packets of the IP flow passing from the destination node toward the source node that contain the second network address as the destination address for the source node and replace the second network address with the first network address as the destination address for the source node to bypass the PDN GW.

In some other embodiments, the proxy element is configured to intercepts the first request for TCP connection being communicated from the source node to the BNG element and to determine that it contains information that satisfies at least one rule defined by an IP flow offloading policy function. The proxy element responds to the determination by communicating a Multi-Path Transmission Control Protocol (MPTCP) request to the source node to establish a MPTCP subflow for an IP flow using the second network address as the source address of the source node. The proxy element generates the second request for TCP connection from the first request for TCP connection by substituting the second network address for the first network address of the source node and communicating the generated second request for TCP connection to the BNG element to establish a TCP connection between the source node and the destination node through the broadband network without passing through the PDN GW.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein.

It will be understood that it would be unduly repetitious and obfuscating to literally describe and illustrate every combination and subcombination of these embodiments. However, it is intended that all embodiments disclosed herein can be implemented separately or combined in any way and/or combination. Accordingly, the present specification, including the drawings, shall be construed to constitute a complete written description of various exemplary combinations and subcombinations of embodiments and of the manner and process of making and using them, and shall support claims to any such combination or subcombination.

As explained above regarding FIG. 1, all data packet traffic flowing from/to the home IP address of node 130 is routed through the PDN GW 110. In particular, the home IP address of node 130 is anchored to the PDN GW 110, so that when the source node 130 is connected to the BNG 100, all data packets originating from the home IP address of source node 130 are routed by the BNG 100 to the PDN GW 110 for communication through the packet data network 120. Similarly, all data packets flowing through the packet data network 120 from other nodes that are directed to the home IP address of source node 130 are routed through the PDN GW 110 and BNG 100 to the source node 130.

Figure 2:
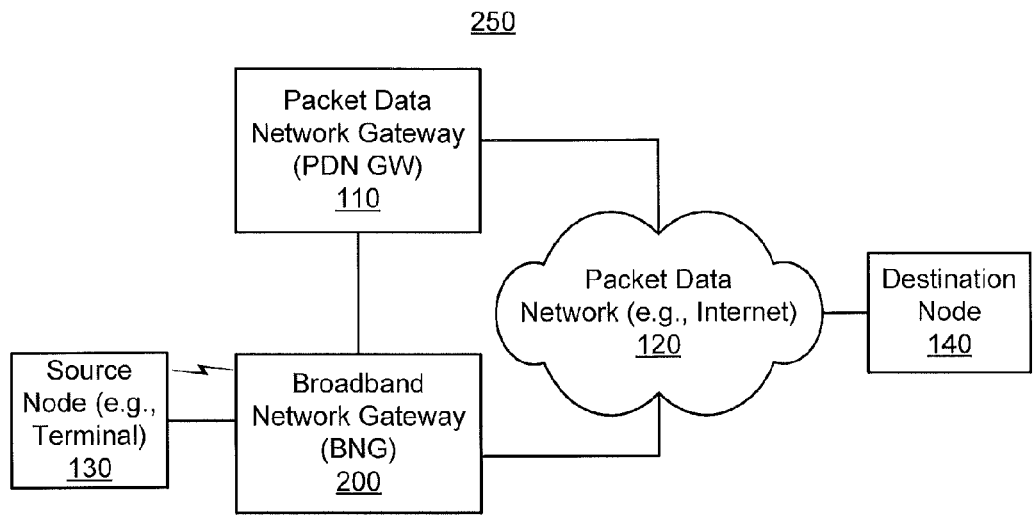
FIGS. 2 and 3 illustrates a network system that supports FMC services in accordance with some embodiments of the present invention.

However, it may be advantageous to enable at least some traffic to/from the source node 130 to bypass the PDN GW 110, thereby avoiding unnecessarily burdening the PDN GW 110 with providing services for that traffic. Various embodiments of the present invention are directed to network elements, methods, and computer program products that cause traffic to/from nodes to bypass a PDN GW. Example embodiments will now be described with reference to FIGS. 2 and 3 which illustrate a network system 250 according to some embodiments of the present invention.

Figure 1:
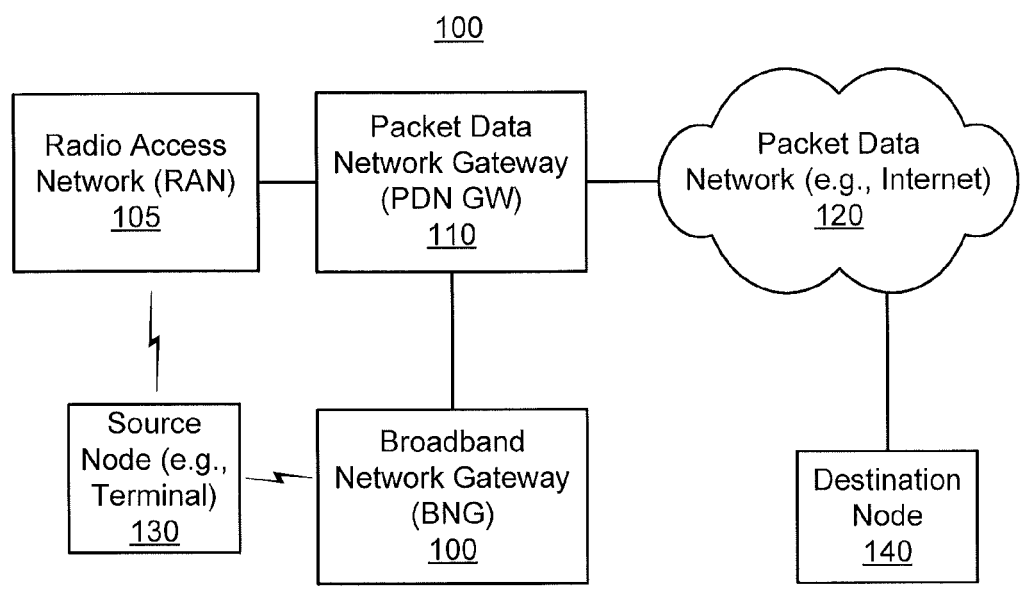
FIG. 1 illustrates a conventional network system that can support FMC services.

The system 250 contains the same/similar elements as shown in FIG. 1, except that a different BNG 200 is now used. Although the BNG 100 of FIG. 1 has a direct connection to the packet data network 120, that connection was not shown because all traffic to/from the source node 130 is routed from the BNG 100 through the PDN GW 110. In contrast, referring to FIG. 2, the BNG 200 is configured to selectively bypass the PDN GW 110 for some traffic that is going from/to the source node 130 by communicating that traffic through a connection to the packet data network 120 without going through the PDN GW 110.

A pair of IP addresses may be assigned to the source node 130, such a home IP address (e.g., IP1) that has the PDN GW 110 as an anchor point for all TCP paths for data packets using that address, and another IP address (e.g., IP2) that is not anchored to the PDN GW 110. The source node 130 may then establish a Transmission Control Protocol (TCP) session using the first IP address (IP1) that goes through the BNG 200, the PDN GW 110, and the packet data network 120 so that all traffic using that source address is handled by the PDN GW 110 policy enforcement, packet filtering, and/or charging support services. Alternatively, the source node 130 may establish a TCP path using the second IP address (IP2) to have all traffic using that source address routed through the BNG 200 to the packet data network 120 while bypassing the PDN GW 110. However, this approach would obligate the user, via operation of the source node 130, to select among available IP addresses when opening a new IP session (e.g., opening a Web browser window) and establishing a TCP path. Moreover, because TCP/IP communications are restricted to a single path per connection, once a TCP path is established it cannot be changed without terminating the existing IP session.

The Internet Engineering Task Force (IETF) has begun work on a Multi-Path TCP (MPTCP) specification that is directed to extending the TCP protocol to provide the ability to simultaneously use multiple paths between user nodes (peers). The specifications are published on the web at datatracker.ietf.org/drafts/current, and include: 1) draft-ietf-mptcp-architecture-01, entitled "Architecture Guidelines for Multipath TCP Development," and 2) draft-ietf-mptcp.multiaddressed-01, "TCP Extensions for Multipath Operation with Multiple Addresses," which are both incorporated herein in their entirety by reference.

Figure 3:
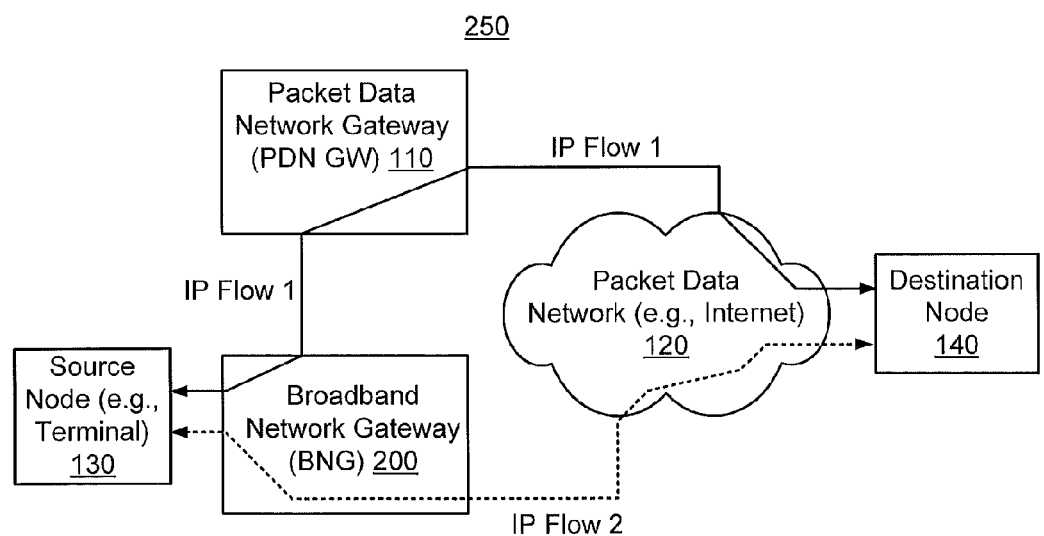

Referring to FIG. 3, the BNG 200 is configured to carry out operations, which can be based in-part on MPTCP, to selectively route data packet traffic through the PDN GW 110 and the packet data network 120 (e.g., illustrated as IP flow 1) to the destination of 140 or, alternatively, route data packet traffic more directly through the packet data network 120 to the destination of 140 while bypassing the PDN GW 110 (e.g., illustrated as IP flow 2). The BNG 200 may enable an operator to dynamically switch the IP address of source node 130 between a home IP address (e.g., a first IPv6 address, IP1) having a prefix advertised by (anchored to) the PDN GW 110 and another IP address (e.g., a second IPv6 address, IP2) that is not advertised by the PDN GW 110, so that data packet traffic is either routed through the PDN GW 110 (traffic not offloaded) or routed so as to not pass through the PDN GW 110 (traffic offloaded) for a single TCP/IP session that is not terminated by the switching of IP addresses and associated offloading/not-offloading of the PDN GW 110.

Figures 4, 5:
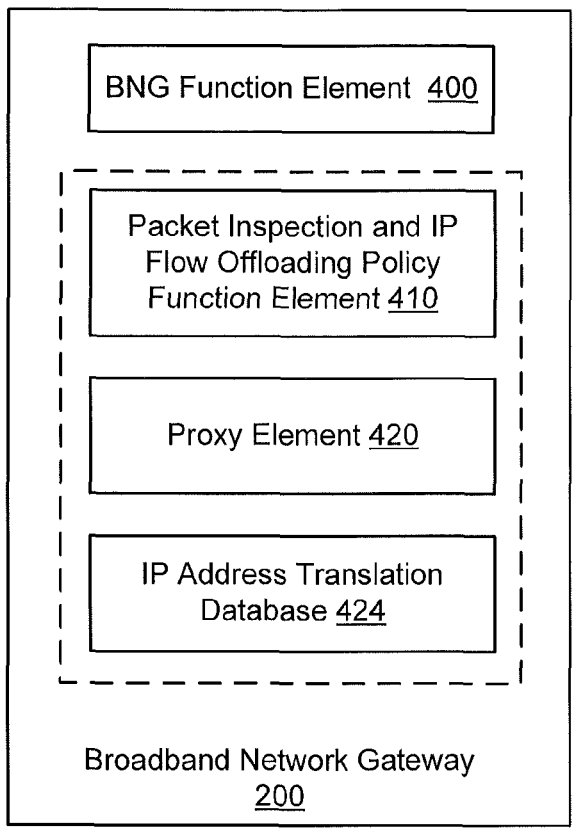
FIG. 4 illustrates a block diagram of a BNG that is configured in accordance with some embodiments of the present invention.
FIG. 5 illustrates a block diagram of an IP address translation database that may be used by the proxy element shown in FIG. 4 in accordance with some embodiments of the present invention.

FIG. 4 illustrates a block diagram of the BNG 200 that is configured in accordance with some embodiments of the present invention. The BNG 200 may include a BNG function element 400 that operates to setup and maintain MPTCP sessions to compatible applications hosted on nodes, such as on the source node 130, while also operating to setup and maintain standard TCP with other applications, which may not support MPTCP, that are hosted on other nodes, such as the destination node 140.

When applications on both the source node 130 and the destination node 140 supports MPTCP, a regular TCP path connection can be established there between and then multiple additional TCP sessions (referred to herein as "subflows") can be created on the TCP path and appear as a single connection to that application. As will be explained below, the BNG 200 may establish a MPTCP connection with the source node 130 initiating a TCP connection, and can use a regular TCP path connection (i.e., not MPTCP) to the destination node 140.

The BNG 200 can also include an IP flow offloading policy function element 410 that is configured to inspect data packets and to apply an IP flow offloading policy in response to the inspection. In some embodiments, the function element 410 inspects the header content of data packets and/or inspects the non-header content, such as the payload, of data packets (referred to herein as "deep packet inspection"), to identify data packet traffic that satisfies at least one policy rule to cause that traffic to be routed without passing through the PDN GW 110 (i.e., offloaded from the PDN GW 110), and to identify other data packet traffic that does not satisfy at least one policy rule and, therefore, is routed through the PDN GW 110. The policy rules provided by the function element 410 may operate to identify and route certain categories of data packet traffic, such as Voice Over Internet Protocol (VoIP) traffic and/or secure Web service traffic, through the PDN GW 110, and to identify and route certain other categories of data packet traffic, such as web gaming traffic or non-secure web-browsing traffic, to the packet data network 120 while bypassing the PDN GW 110.

Selective Bypass of PDN GW by Proxy Element Packet Address Translation:

In some embodiments, the BNG 200 can include a proxy element 420 that controls routing to selectively route some data packets through the PDN GW 110 and to route other data packets so as to bypass the PDN GW 110, which may be done without shutting down an existing TCP session, in response to packet inspection and offloading decisions by the policy function element 410. As will be explained in further detail below with regard to FIGS. 6-9, the source node 130 has at least two IP addresses defined in an address translation database 424. One of the addresses is anchored to the PDN GW 110 while another address is not anchored to the PDN GW 110. The proxy element can intercept and selectively perform source/destination translation of data packets using the IP addresses to cause the PDN GW 110 to be selectively bypassed.

For example, the source node 130 can include a first IP address IP1 (e.g., IPv6) that is anchored to the PDN GW 110 so that all data packets having IP1 as the source address are routed through the PDN GW 110. The source node 130 can include another IP address IP2 (e.g., IPv6) that is not anchored to the PDN GW 110 so that all data packets having IP2 as the source address are not routed through the PDN GW 110. The proxy element 420 may respond to a request from the source node 130 to establish a TCP connection from the first address IP1 to the destination node 140 for data packets associated with an IP flow, by triggering inspection and an offloading decision to be made by the offloading policy function element 410. Data packets are associated with a same IP flow when they share defined properties, which may include, but are not limited to, the same source IP address, the same destination IP address, the same source port, the same destination port, the same IP protocol, and/or the same IP type of service.

When the offloading policy function element 410 determines that the requested TCP connection should bypass the PDN GW 110, the proxy element 420 communicates to the destination node 140 a request for TCP connection that has been modified to have a second network address that has been substituted for the first address IP1 of the source node 130. The modified TCP connection is then established from the source node 130 to the destination node 140 through the packet data network 120 without passing through the PDN GW 110. The proxy element 420 can then intercept data packets of the IP flow that contain the first address IP1 as the source address, and replace the IP1 source address with the IP2 as source address to cause the data packets to bypass the PDN GW 110. The proxy element 420 can also intercept data packets of the IP flow passing from the destination node 140 toward the source node 130 that contain the second address IP2 as the destination address for the source node 130, and replace the IP2 destination address with the IP1 destination address to bypass the PDN GW 110.

FIG. 5 illustrates a block diagram of the IP address translation database 424 shown in FIG. 4 in accordance with some embodiments of the present invention. The example database 424 includes a listing of pairs of IP addresses that are assigned to different source nodes. In the above example, the first address IP1, which can be assigned by the PDN GW 110 to the source node 130, may be recorded in the first column and the first row in the field "source node#1 IP1 address." The second address IP2, which can be assigned by the BNG 200 to the source node 130, may be recorded in the second column and the first row in the field "source node#1 IP2 address." Other pairs of addresses for other source nodes can be recorded in database 424, such as the example records showing that source node 2 has been assigned IP3 address by the PDN GW 110 and IP4 address by the BNG 200. Although source nodes 1 and 2 are shown as having been assigned different IP addresses by the BNG 200, they may alternatively be assigned the same IP address (e.g., IP2 address) by the BNG 200.

Although various embodiments are described herein in the context of the policy function element 410 and the proxy element 420 both residing in the BNG 200 for ease of illustration and description, it is to be understood that one or both of the elements 410, 420 may alternatively reside partially or entirely in another network element that is external to the BNG 200. The offloading policy function element may be at least partially included in the proxy element 420. Moreover, although various embodiments are described herein in the context of controlling routing of data packets flowing in both directions between the source node 130 and the destination node 140 to selectively bypass the PDN GW 110, is to be understood that the routing control may sometimes or always be limited to only one of the directions (e.g. either flowing from or to the source node 130).

Figure 6:
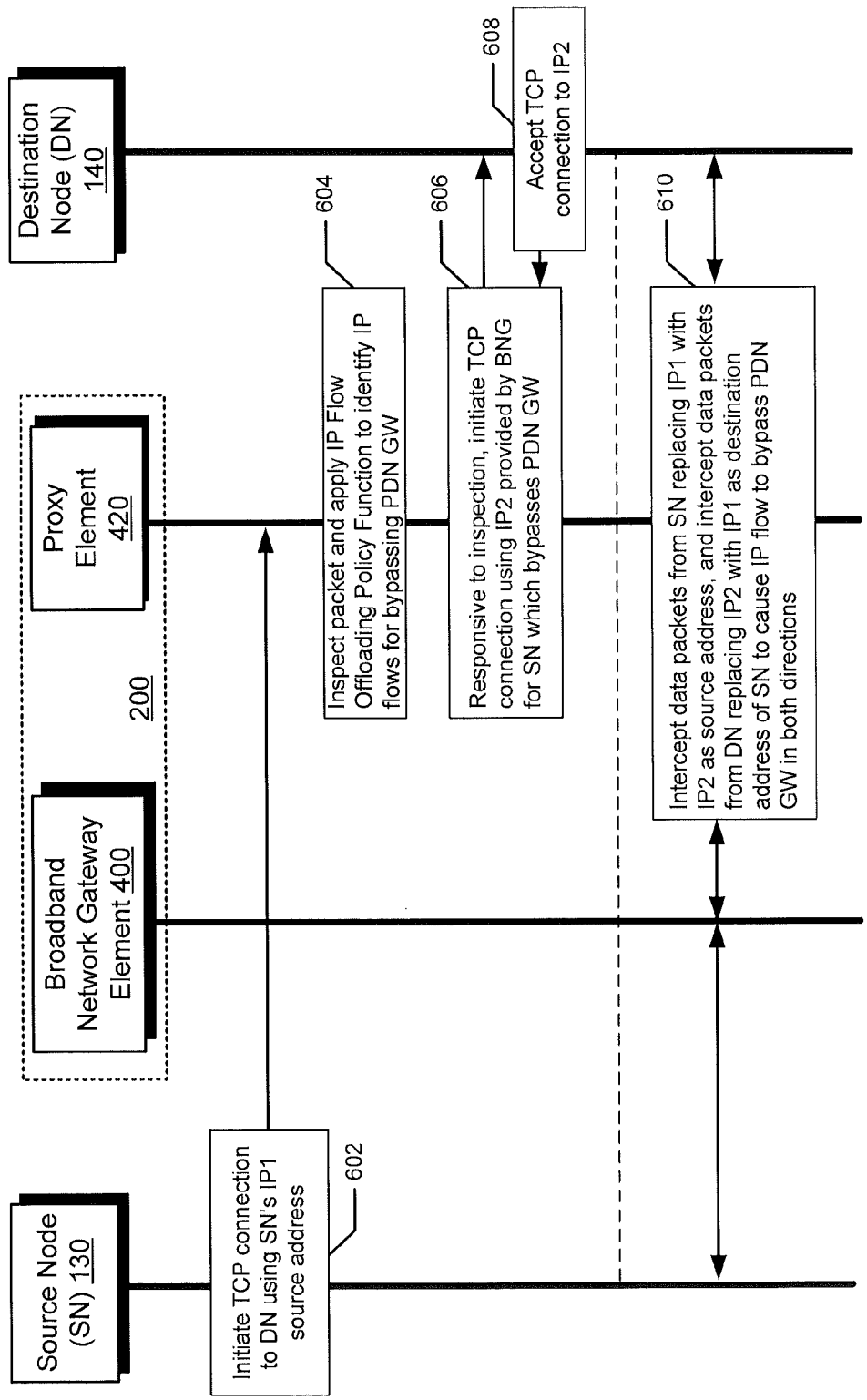
FIG. 6 illustrates a diagram of operations and associated message flows that may be performed by various elements in FIGS. 2-5 to initiate a connection to a destination node and selectively offload data packet traffic from the PDN GW in accordance with some embodiments of the present invention.

FIG. 6 illustrates a diagram of operations and associated message flows that may be performed by various elements in FIGS. 2-5 to initiate a connection between the source node 130 and the destination node 140 that selectively offload data packet traffic from the PDN GW 110 in accordance with some embodiments. Referring to FIG. 6, the source node 130 initiates (block 602) a TCP connection to the destination node 140 using the source address IP1 which would connect through the PDN GW 110 to the packet data network 120. The proxy element 420, via the IP flow offloading policy function element 410, inspects the associated data packet and determines (block 604) whether the data packet satisfies a policy that indicates that the PDN GW 110 should be bypassed. When the PDN GW 110 should be bypassed, the proxy element 420 initiates (block 606) the TCP connection to the destination node 140 using the source address IP2, which is not anchored to the PDN GW 110. The destination node 140 accepts (block 608) the TCP connection which has been identified as arising from the network address IP2.

Thereafter, the proxy element 420 intercepts (block 610) data packets flowing from the source node 130 to the destination node 140 containing source address IP1 and replaces that address with the source address IP2 to bypass the PDN GW. Similarly, the proxy element 420 intercepts (block 610) data packets flowing the opposite direction from the destination node 140 to the source node 130 that contain the destination address IP2 and replaces that address with the destination address IP1 to bypass the PDN GW.

Figure 7:
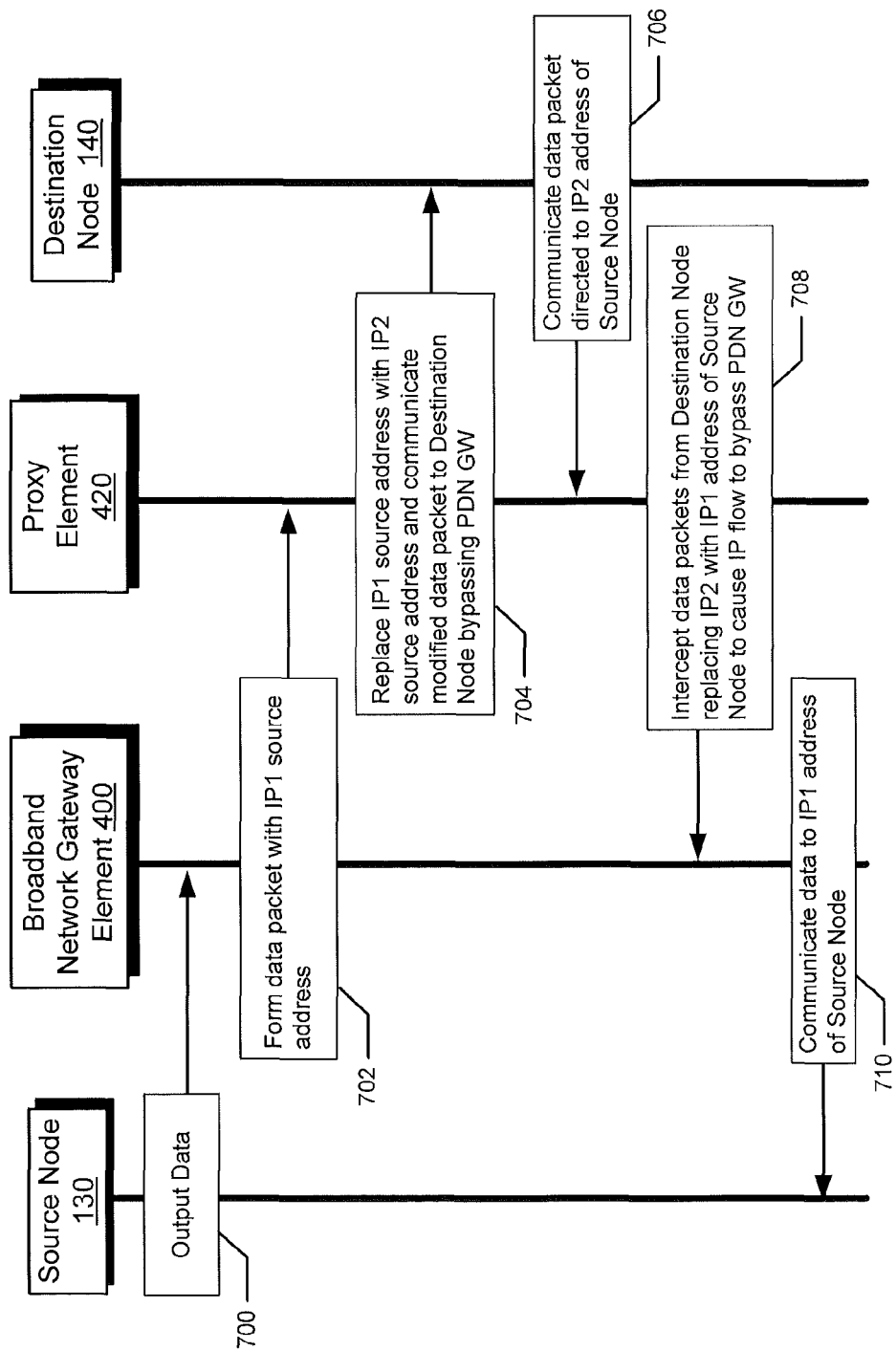
FIGS. 7 and 8 illustrates a diagram of operations and associated message flows that may be performed by various elements in FIGS. 2-5 to offload data packet traffic from the PDN GW in accordance with some embodiments of the present invention.

FIG. 7 illustrates a diagram of operations and associated message flows that may be performed to carry out block 610 of FIG. 6 by various elements in FIGS. 2-5 to offload data packet traffic from the PDN GW 110. Referring to FIG. 7, after a TCP connection has been established, when the source node 130 outputs (block 700) data, the BNG element 400 forms a data packet with the IP1 source address of the source node 130 (block 702). The proxy element 420 intercepts (block 704) the data packet, identifies that the data packet is part of an IP flow that is to bypass the PDN GW 110, looks-up the network address IP2 in the database 424 using the IP1 source address, and replaces the IP1 source address with the IP2 source address to generate a modified data packet. The modified data packet is then communicated (block 704) to the destination node 140 via the packet data network 120 without passing through the PDN GW 110.

With continuing reference to FIG. 7, when the destination node 140 outputs (block 706) a data packet directed to the IP2 address of the source node 130, the proxy element 420 intercepts (block 708) the data packet, identifies that the data packet is part of an IP flow that is to bypass the PDN GW 110, looks-up the network address IP1 in the database 424 using the IP2 destination address, and replaces the IP2 destination address with the IP1 destination address to generate a modified data packet. The modified data packet is then communicated (block 710) to the source node 130 via the packet data network 120 without passing through the PDN GW 110.

Figure 8:
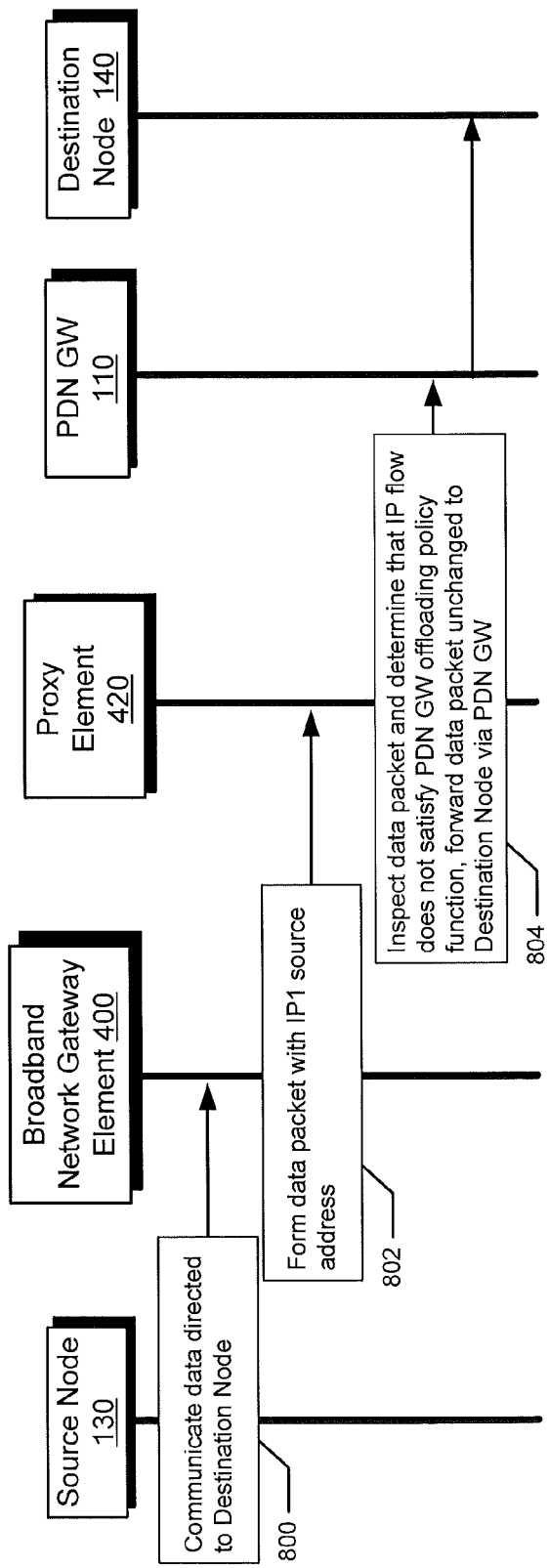

FIG. 8 illustrates a diagram of operations and associated message flows that may be performed by various elements in FIGS. 2-5 when the proxy element 420 determines that a data packet that has an address that is anchored to the PDN GW 110 is not be offloaded from the PDN GW 110. Referring to FIG. 8, after a TCP connection has been established, when the source node 130 outputs (block 800) data directed to the destination node 140, the BNG element 400 forms a data packet with the IP1 source address of the source node 130 (block 802). The proxy element 420 intercepts (block 804) the data packet, identifies that the data packet is not part of an IP flow that is to bypass the PDN GW 110 and, therefore, forwards the data packet unchanged to the destination node 140 via the PDN GW 110.

Figure 9:
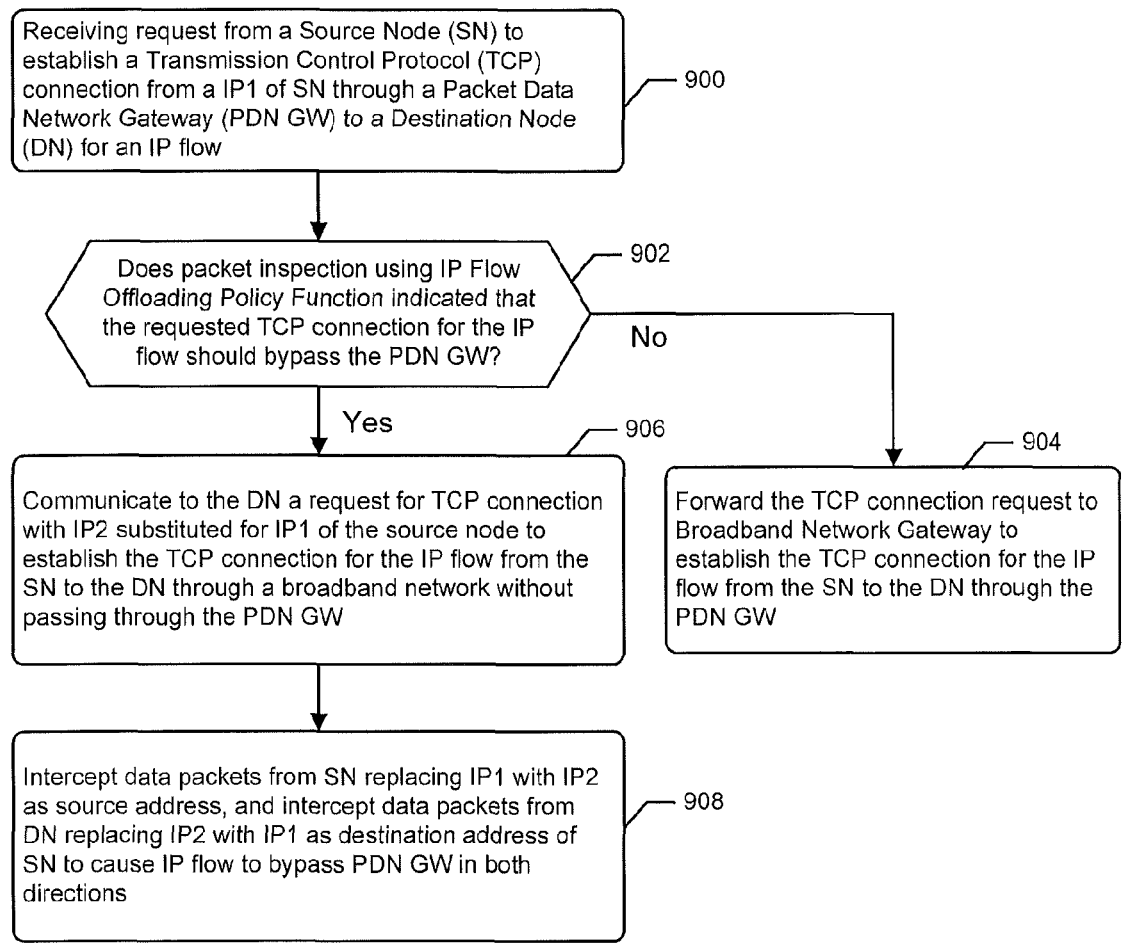
FIG. 9 is a flowchart of operations and methods to selectively offload data packet traffic from the PDN GW in accordance with some embodiments of the present invention.

FIG. 9 is a flowchart of operations and methods that further illustrate how the proxy element 420 can selectively offload packet traffic from the PDN GW 110 in accordance with some embodiments of the present invention. For purposes of explanation only, the source node 130 again has two network addresses IP1 and IP2, where network address IP1 is anchored to the PDN GW 110 and network address IP2 is not anchored to the PDN GW 110. Referring to FIG. 9, the proxy element 420 receives (block 900) a request from the source node 130 to establish a TCP connection from the network address IP1 to the destination node 140 for an IP flow. The proxy element 420 inspects (block 902) the associated packet from the source node 130 using the IP flow offloading policy function 410 to determine whether the associated IP flow should bypass the PDN GW 110. When the proxy element 420 determines that the IP flow should not bypass the PDN GW 110 (e.g., responsive to it containing a defined type of payload such as VoIP, secure web service, etc.), the TCP connection request is forwarded (block 904) to the BNG function element 400 to establish the TCP connection from the source node 130 to the destination node 140 through the PDN GW 110.

In contrast, when the proxy element 420 determines that the IP flow should bypass the PDN GW 110 (e.g., responsive to it containing another defined type of payload such as non-secure web service, etc.), the proxy element 420 modifies the TCP connection request by substituting the IP2 source address for the IP1 source address, and communicates (block 906) the modified TCP connection request to the BNG function element 400 to establish the TCP connection from the source node 130 to the destination node 140 without passing through the PDN GW 110. Thereafter, the proxy element 420 intercepts (block 908) data packets sent from the source node 130 replacing the IP1 source address with the IP2 source address and intercepts data packets sent from the destination node 140 to the source node 130 replacing the IP2 destination address with the IP1 destination address to bypass the PDN GW 110 in both directions for data packets in the IP flow.

Selective Bypass of PDN GW by Proxy Element without Packet Address Translation:

In some other embodiments, the proxy element 420 controls routing to selectively route some data packets through the PDN GW 110 and to route other data packets so as to bypass the PDN GW 110, but without performing the packet interception and address translation after the TCP connection has been established. In contrast to the embodiments explained above regarding FIGS. 6-9, to bypass the PDN GW 110 the proxy element 420 establishes a MPTCP subflow connection to the source node 130, while emulating the destination node 140, and establishes a TCP connection to the destination node 140 using an IP address for the source node 130 that results in the path bypassing the PDN GW 110.

For purpose of explanation only, the source node 130 has at least two addresses, including a first IP address IP1 (e.g., IPv6) that is anchored to the PDN GW 110 so that all data packets having IP1 as the source address are routed through the PDN GW 110, and a second IP address IP2 (e.g., IPv6) that is not anchored to the PDN GW 110 so that all data packets having IP2 as the source address are not routed through the PDN GW 110.

Figure 10:
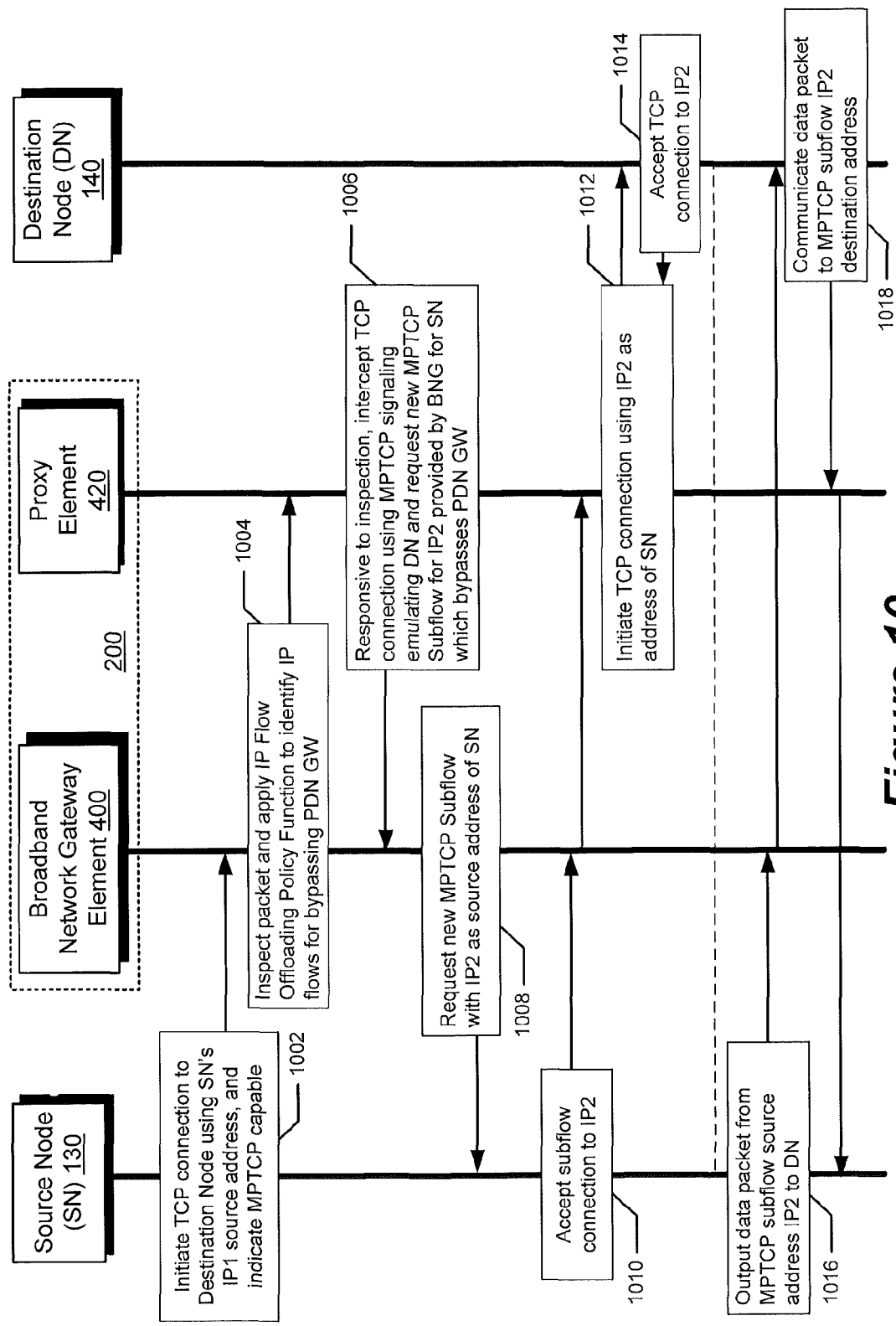
FIG. 10 illustrates a diagram of operations and associated message flows that may be performed by various elements in FIGS. 2-5 to initiate a Multi-Path Transmission Control Protocol (MPTCP) connection to a source node and selectively offload data packet traffic from the PDN GW in accordance with some other embodiments of the present invention.

FIG. 10 illustrates a diagram of operations and associated message flows that may be performed by various elements in FIGS. 2-5 to initiate a MPTCP connection to the source node 130 and selectively offload data packet traffic from the PDN GW 110. Referring to FIG. 10, the source node 130 initiates (block 1002) a TCP connection to the destination node 140 using the source address IP1 and indicates that the associated application is MPTCP capable. The BNG element 400 inspects the associated data packet and determines (block 1004) whether the data packet satisfies a policy that indicates that the PDN GW 110 should be bypassed. Alternatively, in some embodiments, the proxy element 420 may perform the packet inspection operations (block 1004).

When the PDN GW 110 should be bypassed, the proxy element 420 communicates (block 1006) a MPTCP subflow request to the source node 130 to establish a MPTCP subflow to the IP flow using the second IP address IP2 as the source address of the source node 130. The BNG function element 400 communicates (block 1008) to the source node 130 the MPTCP subflow request and identifying IP2 as the source address of the source node 130. The source node 130 establishes (block 1010) the MPTCP subflow and communicates an acceptance message to the proxy node 420.

When communicating (block 1006) the MPTCP subflow request to the source node 130, the proxy element 420 uses signaling that appears to the source node 130 to have been generated by the destination node 140 but which can be generated by the proxy element 420 without using signaling from the destination node 140. For example, as shown in FIG. 10, the proxy node 420 can communicate the MPTCP subflow request to the source node 130 before communicating an associated TCP connection request to the destination node 140.

The proxy element 420 responds to the acceptance message by communicating (block 1012) to the destination node 140 a TCP connection request (e.g., a single-path TCP request) with the second IP address IP2 substituted for the first IP address IP1 as the source address of the source node 130. The destination node 140 accepts the TCP connection (block 1014).

Thereafter, the source node 130 communicates data packets to the destination node 140 through the BNG 200 using the MPTCP subflow and the second IP address IP2 as the source address. Because the second IP address IP2 is used as the source address, the data packet traffic bypasses the PDN GW 110. In the opposite direction, the destination node 140 communicates data packets to the source node 130 using the TCP connection and the second IP address IP2 as the destination address. Because the second IP address IP2 is used as the destination address, the data packet traffic bypasses the PDN GW 110.

Figure 11:
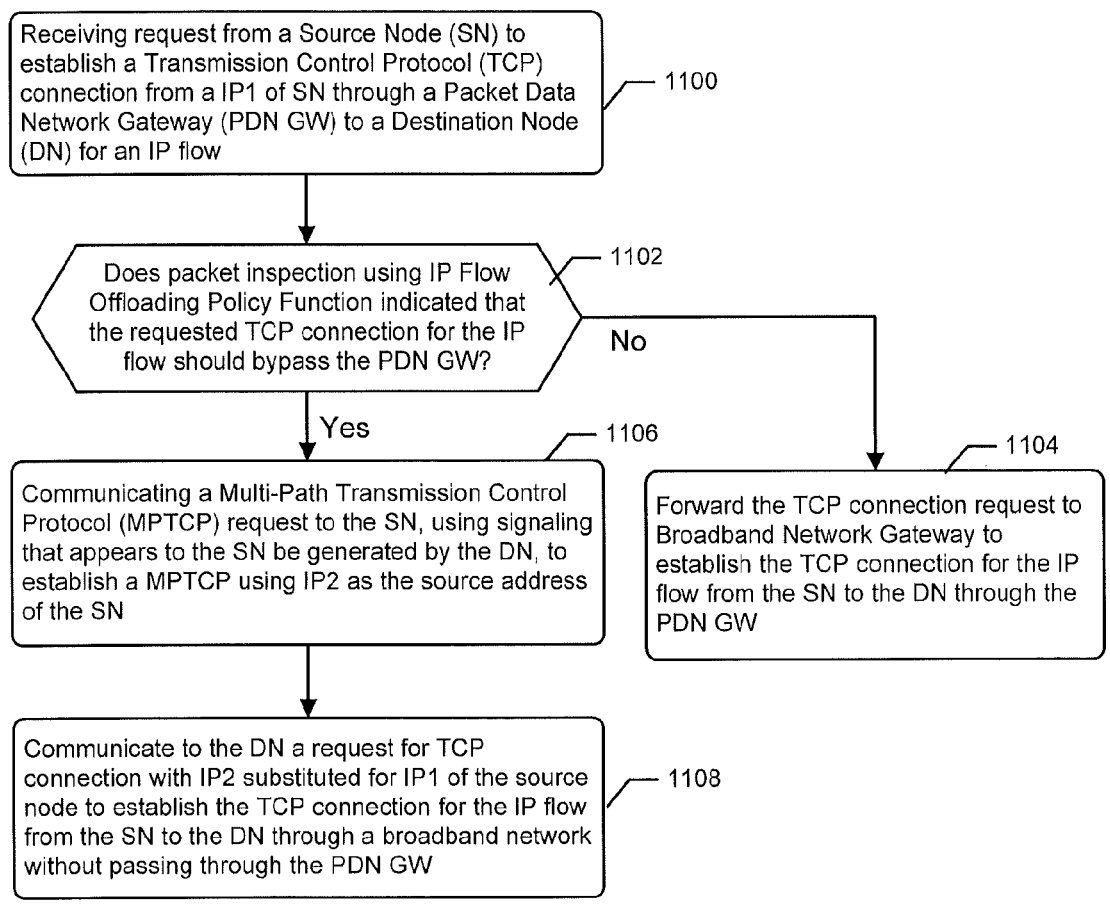
FIG. 11 is a flowchart of operations and methods to selectively offload data packet traffic from the PDN GW in accordance with some other embodiments of the present invention.

FIG. 11 is a flowchart of operations and methods that further illustrate how the proxy element 420 can selectively offload packet traffic from the PDN GW 110 in accordance with the operations and message flows shown in FIG. 10. Referring to FIG. 11, the proxy element 420 receives (block 1100) a request from the source node 130 to establish a TCP connection from the network address IP1 to the destination node 140 for an IP flow. The proxy element 420 inspects (block 1102) the associated packet from the source node 130 using the IP flow offloading policy function 410 to determine whether the associated IP flow should bypass the PDN GW 110. When the proxy element 420 determines that the IP flow should not bypass the PDN GW 110 (e.g., responsive to it containing a defined type of payload such as VoIP, secure web service, etc.), the TCP connection request is forwarded (block 1104) to the BNG function element 400 to establish the TCP connection from the source node 130 to the destination node 140 through the PDN GW 110.

In contrast, when the proxy element 420 determines that the IP flow should bypass the PDN GW 110 (e.g., responsive to it containing another defined type of payload such as non-secure web service, etc.), the proxy element 420 communicates a MPTCP subflow request to the source node 130 to establish a MPTCP subflow to the IP flow using the second IP address IP2 as the source address of the source node 130. When communicating (block 1106) the MPTCP subflow request to the source node 130, the proxy element 420 can use signaling that appears to the source node 130 to have been generated by the destination node 140 but which can be generated by the proxy element 420 without using signaling from the destination node 140. The proxy element 420 then communicates (block 1108) to the destination node 140 a TCP connection request (e.g., a single-path TCP request) with the second IP address IP2 substituted for the first IP address IP1 as the source address of the source node 130. The resulting path between the source node 130 and destination node 140 bypasses the PDN GW 110.

Figure 12:
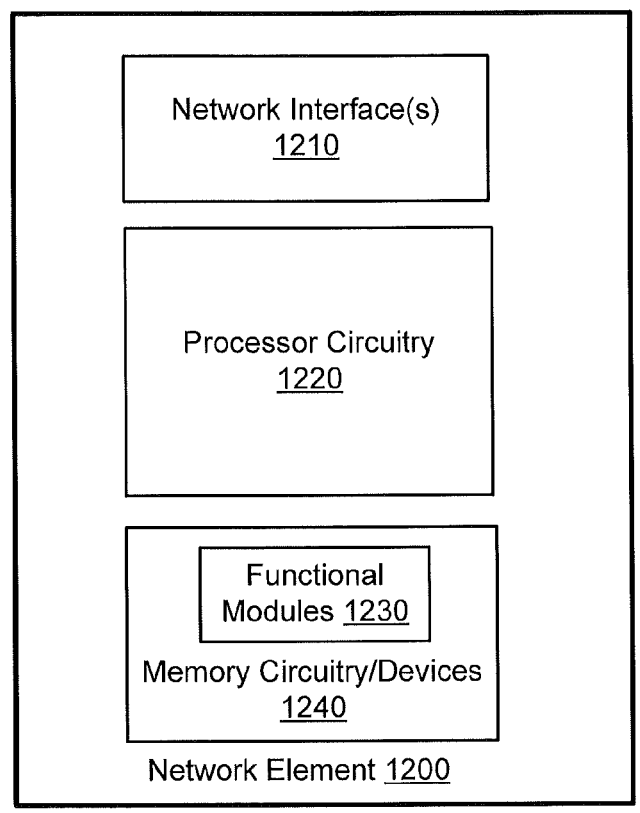
FIG. 12 illustrates a block diagram of a network element that is configured in accordance with some embodiments of the present invention.

Example Network Element Architecture:

FIG. 12 illustrates a block diagram of a network element 1200 that is configured in accordance with some embodiments of the present invention. The network element 1200 may be used in the source node 130, the destination node 140, the PDN GW 110, the proxy element 420, and/or the BNG 200 and configured to carry-out at least some of the respective functionality described herein. Referring to FIG. 12, the network element 1200 can include one or more network interfaces 1210, processor circuitry 1220, and memory circuitry/devices 1240 that contain functional modules 1260.

The processor circuitry 1220 may include one or more data processing circuits, such as a general purpose and/or special purpose processor (e.g., microprocessor and/or digital signal processor). The processor circuitry 1220 is configured to execute computer program instructions from the functional modules 1230 in the memory circuitry/devices 1240, described below as a computer readable medium, to perform some or all of the operations and methods that are described above for one or more of the embodiments, such as the embodiments of FIGS. 2-11. Accordingly, the processor circuitry 1220 can be configured by execution of the computer program instructions in the functional modules 1230 to carry out at least some of the functionality described herein to setup TCP connections and route packets to selectively bypass a PDN GW.

In the above explanation of exemplary embodiments of the invention, it is to be understood that, when a element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. In the description and appending drawings, like numbers refer to like elements throughout. Furthermore, "coupled", "connected", "responsive", or variants thereof as used herein may include wirelessly coupled, connected, or responsive. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present invention. All such variations and modifications are intended to be included herein within the scope of the present invention, as set forth in the following claims.

What is claimed is:

1. A network element comprising:
   a proxy element that is configured to:
   receive a request from a source node to establish a Transmission Control Protocol (TCP) connection from a first network address of the source node through a Packet Data Network (PDN) Gateway (GW) to a destination node for an Internet Protocol (IP) flow, apply an IP flow offloading policy function to determine that the requested TCP connection for the IP flow should bypass the PDN GW, and
   respond to the determination by communicating to the destination node a request for TCP connection with a second network address substituted for the first network address of the source node to establish the TCP connection for the IP flow from the source node to the destination node through a broadband network without passing through the PDN GW;
   respond to the establishment of the TCP connection by intercepting packets of the IP flow passing from the source node toward the destination node that contain the first network address as the source address and to replace the first network address with the second network address as the source address to bypass the PDN GW;
   respond to the determination of the IP flow offloading policy function by communicating a Multi-Path Transmission Control Protocol (MPTCP) request to the source node to establish a MPTCP subflow to the IP flow using the second network address as the source address of the source node;
   communicate the MPTCP request to the source node using signaling that appears to the source node to have been generated by the destination node but which is generated by the proxy element without using signaling from the destination node.

2. The network element of claim 1, wherein the proxy element is further configured to:
   establish the MPTCP subflow with the source node before communicating to the destination node the request for TCP connection.

3. The network element of claim 1, wherein the proxy element is further configured to:

communicate to the destination node the request for TCP connection as a single-path TCP request to the destination node using the second network address as the source address of the source node.

4. The network element of claim 1, wherein the proxy element is further configured to:
receive the first network address of the source node as originating from the PDN GW, and
receive the second network address of the source node as originating from a Broadband Network Gateway (BNG).

5. The network element of claim 4, wherein the proxy element is further configured to:
receive the first network address as an IPv6 address that has connection service provided by the PDN GW for a radio access network, and
receive the second network address as an Internet Protocol version 6 (IPv6) address that has connection service provided by the BNG which maps the second network address to a broadband network interface without passing through the PDN GW for the radio access network.

6. The network element of claim 1, wherein the proxy element resides in a Broadband Network Gateway (BNG).

7. A method of offloading Internet Protocol (IP) flows from a Packet Data Network (PDN) Gateway (GW) the method comprising; receiving a request from a source node to establish a Transmission Control Protocol (TCP) connection from a first network address of the source node through the PDN GW to a destination node for an IP flow;
determining from an IP flow offloading policy function that the requested TCP connection for the IP flow should bypass the PDN GW; and responsive to the determination from the IP flow offloading policy function, communicating from a proxy element to the destination node a request for TCP connection with a second network address substituted for the first network address of the source node to establish the TCP connection for the IP flow from the source node to the destination node through a broadband network without passing through the PDN GW;
intercepting packets of the IP flow passing from the source node toward the destination node that contain the first network address as the source address and operating the proxy element to replace the first network address with the second network address as the source address to bypass the PDN GW; and
responsive to the determination from the IP flow offloading policy function, communicating a Multi-Path Transmission Control Protocol (MPTCP) request from the proxy element to the source node to establish a MPTCP subflow to the IP flow using the second network address as the source address of the source node;
wherein the MPTCP request is communicated to the source node using signaling that appears to the source node to have been generated by the destination node but which is generated by the proxy element without using signaling from the destination node.

8. The method of claim 7, further comprising:
intercepting packets of the IP flow passing from the destination node toward the source node that contain the second network address as the destination address for the source node and operating the proxy element to replace the second network address with the first network address as the destination address for the source node to bypass the PDN GW.

9. The method of claim 7, further comprising:
receiving the first network address at the proxy element as an Internet Protocol version 6 (IPv6) address that has connection service provided by the PDN GW for a radio access network; and
receiving the second network address at the proxy element as an IPv6 address that has connection service provided by the BNG which maps the second network address to a broadband network interface without passing through the PDN GW for the radio access network.

10. A system comprising:
a Broadband Network Gateway (BNG) element that is configured to respond to receipt of a first request for Transmission Control Protocol (TCP) connection having a first network address of a source node by establishing a first TCP connection between the source node and a destination node through a Packet Data Network (PDN) Gateway (GW) of a radio access network and a broadband network, and respond to receipt of a second request for TCP connection having a second network address of the source node by establishing a second TCP connection between the source node and the destination node through the broadband network without passing through the PDN GW; and
a proxy element that is configured to intercept the first request for TCP connection being communicated from the source node to the BNG element and to determine that it contains information that satisfies at least one rule defined by an IP flow offloading policy function, to respond to the determination by communicating a Multi-Path Transmission Control Protocol (MPTCP) request to the source node to establish a MPTCP subflow for an Internet Protocol (IP) flow using the second network address as the source address of the source node, and
generating the second request for TCP connection from the first request for TCP connection by substituting the second network address for the first network address of the source node and communicating the generated second request for TCP connection to the BNG element to establish a TCP connection between the source node and the destination node through the broadband network without passing through the PDN GW,
wherein the proxy element is further configured to communicate the MPTCP request to the source node using signaling that appears to the source node to have been generated by the destination node but which is generated by the proxy element without using signaling from the destination node.

* * * * *